US009433996B2

(12) United States Patent
Wintersteen et al.

(10) Patent No.: US 9,433,996 B2
(45) Date of Patent: Sep. 6, 2016

(54) METHOD OF MAKING A HEAT EXCHANGER WITH AN ENHANCED MATERIAL SYSTEM

(75) Inventors: Douglas C. Wintersteen, Burt, NY (US); Kurt R. Mittlefehldt, Amherst, NY (US)

(73) Assignee: MAHLE International GmbH, Stuttgart (DE)

( * ) Notice: Subject to any disclaimer, the term of this patent is extended or adjusted under 35 U.S.C. 154(b) by 350 days.

(21) Appl. No.: 14/112,129

(22) PCT Filed: Apr. 25, 2012

(86) PCT No.: PCT/US2012/034951
§ 371 (c)(1),
(2), (4) Date: Oct. 16, 2013

(87) PCT Pub. No.: WO2012/149988
PCT Pub. Date: Nov. 1, 2012

(65) Prior Publication Data
US 2014/0033534 A1 Feb. 6, 2014

Related U.S. Application Data

(60) Provisional application No. 61/478,709, filed on Apr. 25, 2011.

(51) Int. Cl.
*B21D 53/08* (2006.01)
*F28F 19/06* (2006.01)
*B23K 1/00* (2006.01)
*F28F 19/02* (2006.01)
*F28F 1/12* (2006.01)
*B23K 1/20* (2006.01)
*B23K 35/362* (2006.01)
*C22C 21/00* (2006.01)
*F28F 21/08* (2006.01)
*F28D 1/053* (2006.01)
*B32B 15/01* (2006.01)
*C22C 21/10* (2006.01)
*B23K 103/10* (2006.01)
*B32B 15/16* (2006.01)

(52) U.S. Cl.
CPC ............ *B21D 53/08* (2013.01); *B23K 1/0012* (2013.01); *B23K 1/203* (2013.01); *B23K 35/362* (2013.01); *B32B 15/016* (2013.01); *C22C 21/00* (2013.01); *C22C 21/10* (2013.01); *F28D 1/05366* (2013.01); *F28F 1/126* (2013.01); *F28F 19/02* (2013.01); *F28F 19/06* (2013.01); *F28F 21/084* (2013.01); *F28F 21/089* (2013.01); *B23K 2203/10* (2013.01); *F28F 2275/04* (2013.01); *Y10T 29/4938* (2015.01); *Y10T 29/49885* (2015.01); *Y10T 29/49968* (2015.01)

(58) Field of Classification Search
CPC ..... B23P 15/26; B21D 53/02; B21D 53/022; B21D 53/08; B21D 53/04; B21D 53/06; B21D 53/081; Y10T 29/49968; Y10T 29/4938; Y10T 29/49885; C23C 10/28; C23C 22/00; C23C 28/025; C23C 28/3225; C23C 28/34; B23K 1/0012; B23K 2201/14; B23K 1/203; B23K 35/362; B23K 2203/10; C22F 1/04; C22C 21/10; C22C 21/00; B32B 15/016; F28F 21/084; F28F 21/089; F28F 19/02; F28F 1/126; F28F 19/06; F28F 2275/04; F28D 1/05366
USPC .......................... 228/183, 244–262, 207, 223; 427/376.6, 383.7, 404, 409, 428.01
See application file for complete search history.

(56) References Cited

U.S. PATENT DOCUMENTS

| | | | | |
|---|---|---|---|---|
| 5,148,862 | A * | 9/1992 | Hashiura | B32B 15/016 165/133 |
| 6,193,140 | B1 * | 2/2001 | Suzuki | B23K 1/0012 228/182 |
| 6,316,126 | B1 * | 11/2001 | Hasegawa | B32B 15/016 138/140 |
| 6,432,221 | B1 | 8/2002 | Seseke-Koyro et al. | |
| 6,503,446 | B1 * | 1/2003 | Ren | C22C 21/00 420/540 |
| 6,921,584 | B2 * | 7/2005 | Syslak | B23K 35/0238 165/180 |

(Continued)

FOREIGN PATENT DOCUMENTS

DE   10 2006 032 406 A1   1/2008
EP        1 918 394 A2    5/2008

(Continued)

OTHER PUBLICATIONS

PCT/US12/34951 International Seach Report Dated Jul. 18, 2012.

(Continued)

*Primary Examiner* — David Bryant
*Assistant Examiner* — Lawrence Averick
(74) *Attorney, Agent, or Firm* — Brinks Gilson & Lione

(57) ABSTRACT

The disclosure relates to a method of manufacturing a heat exchanger assembly with an enhanced material system. The enhanced material system includes refrigerant tubes extruded from a high purity AA3000 series alloy billet having about 1% by weight (wt %) Mn and pre-braze treated with either a reactive zinc flux or a mixture of elemental zinc powder and a controlled atmosphere brazed (CAB) flux applied by glass plasma or organic binder, such as an organic binder, fins formed from modified a AA3003 alloy having less than 0.05 wt % Cu and from 1.2 to 1.8% wt % Zn, and header manifolds manufactured from a AA3000 series alloy with a AA4000 series cladding having 0.9 to 1.1 wt % Zn. The enhanced material system may also include a post braze coating and a subsequent organic polymer resin topcoat.

15 Claims, 1 Drawing Sheet

(56) References Cited

U.S. PATENT DOCUMENTS

| | | | |
|---|---|---|---|
| 6,939,417 B2 | 9/2005 | Marois et al. | |
| 7,018,722 B2 * | 3/2006 | Toyama | B32B 15/016 |
| | | | 165/905 |
| 7,250,223 B2 * | 7/2007 | Miyachi | F28F 19/06 |
| | | | 165/133 |
| 7,534,309 B2 * | 5/2009 | Toyama | B23K 1/0012 |
| | | | 106/240 |
| 7,781,071 B2 * | 8/2010 | Parson | C22C 21/00 |
| | | | 165/180 |
| 2004/0035910 A1 * | 2/2004 | Dockus | B23K 35/002 |
| | | | 228/56.3 |
| 2006/0231170 A1 | 10/2006 | Parson et al. | |
| 2008/0257533 A1 | 10/2008 | Rottmann | |
| 2009/0260794 A1 * | 10/2009 | Minami | B23K 1/0012 |
| | | | 165/182 |
| 2010/0159272 A1 | 6/2010 | Marois et al. | |
| 2011/0000505 A1 | 1/2011 | Yang et al. | |
| 2011/0076184 A1 | 3/2011 | Zhang et al. | |
| 2011/0220617 A1 | 9/2011 | Becker et al. | |
| 2012/0315497 A1 * | 12/2012 | Becker | B23K 1/19 |
| | | | 428/472.2 |
| 2013/0098591 A1 * | 4/2013 | Taras | F28D 1/0477 |
| | | | 165/181 |

FOREIGN PATENT DOCUMENTS

| | | |
|---|---|---|
| WO | 02/090031 A2 | 11/2002 |
| WO | 2005/066570 A1 | 7/2005 |
| WO | 2010/060869 A1 | 6/2010 |

OTHER PUBLICATIONS

"Zn Flux—The Alternative Flux for Corrosion Protection," originally appearing in Aluminium Brazing—News, Knowledge & Technology, Aug. 27, 2010, 2 pages.

Aleris Rolled & Extruded Products—Europe, Marketing Communication: Aluminum Heat Exchanger Materials, May 9, 2007, 20 pages (see p. 10 in particular).

* cited by examiner

METHOD OF MAKING A HEAT EXCHANGER WITH AN ENHANCED MATERIAL SYSTEM

CROSS-REFERENCE TO RELATED APPLICATION

This application claims the benefit of U.S. Provisional Patent Application Ser. No. 61/478,709 for an ENHANCED MATERIAL SYSTEMS FOR ALUMINUM HEAT EXCHANGERS, filed on Apr. 25, 2011, which is hereby incorporated by reference in its entirety.

TECHNICAL FIELD OF INVENTION

The present disclosure relates to an aluminum heat exchanger; more specifically, to a method of manufacturing an aluminum heat exchanger with an enhanced material system.

BACKGROUND OF INVENTION

A basic heat exchanger assembly, such as a condenser or evaporator for use in a motor vehicle or for use in residential/commercial applications including heat pumps, typically includes an inlet header manifold, an outlet header manifold, a plurality of refrigerant tubes hydraulically connecting the header manifolds for a two phase refrigerant flow therebetween, and external fins disposed between adjacent refrigerant tubes for increased heat transfer efficiency. The core assembly, also known as the center assembly, of the heat exchanger assembly is defined by the assembly of refrigerant tubes and corrugated fins interconnecting the refrigerant tubes. The header manifolds, tubes, and fins are typically assembled into a unitary structure and then brazed to form the unitary heat exchanger assembly.

Aluminum heat exchanger assemblies are desirable for their lightweight, ease of manufacturability, and heat transfer efficiencies. The refrigerant tubes are known to be manufactured by extruded aluminum alloys and are controlled atmosphere brazed (CAB) using a potassium fluoroaluminate flux. The CAB flux is applied to the heat exchanger assembly using an electrostatic fluxer or by wet slurry prior to the brazing of the heat exchanger assembly. Before brazing, the aluminum refrigerant tubes are processed with a pre-applied coating of zinc thermal spray at a weight of 8 to 12 g/m$^2$. The Zn is diffused into the refrigerant tube aluminum substrate during brazing, thereby creating a sacrificial corrosion layer consisting of a gradient of Zn. Post braze, the Zn beneath the surface is approximately 4 to 7 wt % and diffused to a depth of approximately 100 microns, depending on the braze profile. The corrugated fins are typically formed of double sided clad aluminum alloy sheet. The header manifolds are typically manufactured of a single side clad aluminum sheet welded into a tube having corresponding slots for the insertion of the refrigerant tube ends.

This material system is sufficient for most automotive and non-automotive applications in geographic locations with nominal to low environmental pollutants that may corrode the aluminum substrate of the heat exchanger assembly. However, from a global perspective, there are regions of the world that have higher levels of environmental pollutants that may accelerate the corrosion of the aluminum heat exchanger assembly. Environmental pollutants can be acid rain, road de-icing salts, air pollutants, which includes diesel exhaust condensate, fertilizers, alkaline compounds and acetic and formic acids from construction, and seacoast chlorides. An aluminum heat exchanger assembly functioning as an evaporator sees corrosive condensates with pH values that can be as low as 4 from acid rain. The condensate accumulating on the heat exchanger assembly may have a high degree of conductivity caused by industrial pollution, in which the high conductivity increases the corrosive effect. There is a continual need to reduce the corrosion rates of aluminum heat exchangers to prolong service life in corrosive environments.

SUMMARY OF INVENTION

The present invention relates to method of manufacturing an aluminum heat exchanger with an enhanced material system. The method includes providing a plurality of refrigerant tubes extruded of an AA3000 series Al alloy having 0.3 percent by weight (wt %) max of Si, 0.20 wt % max of Fe, 0.03 wt % max of Cu, and between 0.90 to 1.10 wt % of Mn; providing a plurality of fins manufactured from an AA3000 series Al alloy having 0.3 to 1.0 wt % of Si, 0.4 wt % of Fe max, 0.05 wt % max of Cu, from 1.3 to 1.8 wt % of Mn, between 1.2 to 1.8 wt % of Zn, and 0.20 wt % max of Zr; and providing at least one header manifold having a plurality of refrigerant tube slots.

The header manifold is formed from an AA3000 series Al alloy sheet having a cladding, wherein the Al alloy sheet may include a core having 0.6 wt % max of Si, 0.7 wt % max of Fe, from 0.05 to 0.65 wt % of Cu, from 1.0 to 1.6 wt % of Mn, 0.20 wt % max of Mg, 0.10 wt % max of Zn, and 0.25 wt % max of Ti. The cladding of Al alloy sheet of header manifold may include 6.8 to 8.2 wt % of Si, 0.8 wt % max of Fe, 0.25 wt % max of Cu, 0.10 wt % max of Mn and 0.9 to 1.1 wt % Zn. In the alternative the cladding of Al alloy sheet of header manifold may include 9.0 to 11.0 wt % of Si, 0.8 wt % max of Fe, 0.30 wt % max of Cu, 0.05 wt % max of Mn, 0.05 wt % max of Mg, and 0.9 to 1.1 wt % of Zn.

A Zn coating is applied onto the exterior surface of at least one of the plurality of refrigerant tubes. The step of the applying a Zn coating may include applying a sufficient amount of Zn to obtain a Zn diffusion layer having 1 to 3 wt % of Zn beneath the surface having a maximum depth of diffusion of 85 microns after brazing.

The fins are assembled between adjacent pairs of the refrigerant tubes and the open ends of the plurality of refrigerant tubes are inserted into the corresponding refrigerant tube slots of header manifold, thereby forming a heat exchanger assembly. The heat exchanger assembly is then heat treated at a sufficient time and temperature to braze the plurality of refrigerant tubes, fins, and the at least one header manifold into a single unitary structure, and to diffuse the Zn coating into the refrigerant tubes to form the Zn diffusion layer.

The method of manufacturing an aluminum heat exchanger with an enhanced material system provides a heat exchanger that offers superior corrosion protection as compared to known aluminum heat exchangers in the art. Further features and advantages of the invention will appear more clearly on a reading of the following detailed description of an embodiment of the invention, which is given by way of non-limiting example only and with reference to the accompanying drawings.

BRIEF DESCRIPTION OF DRAWINGS

This invention will be further described with reference to the accompanying drawings in which.

Figure 1:
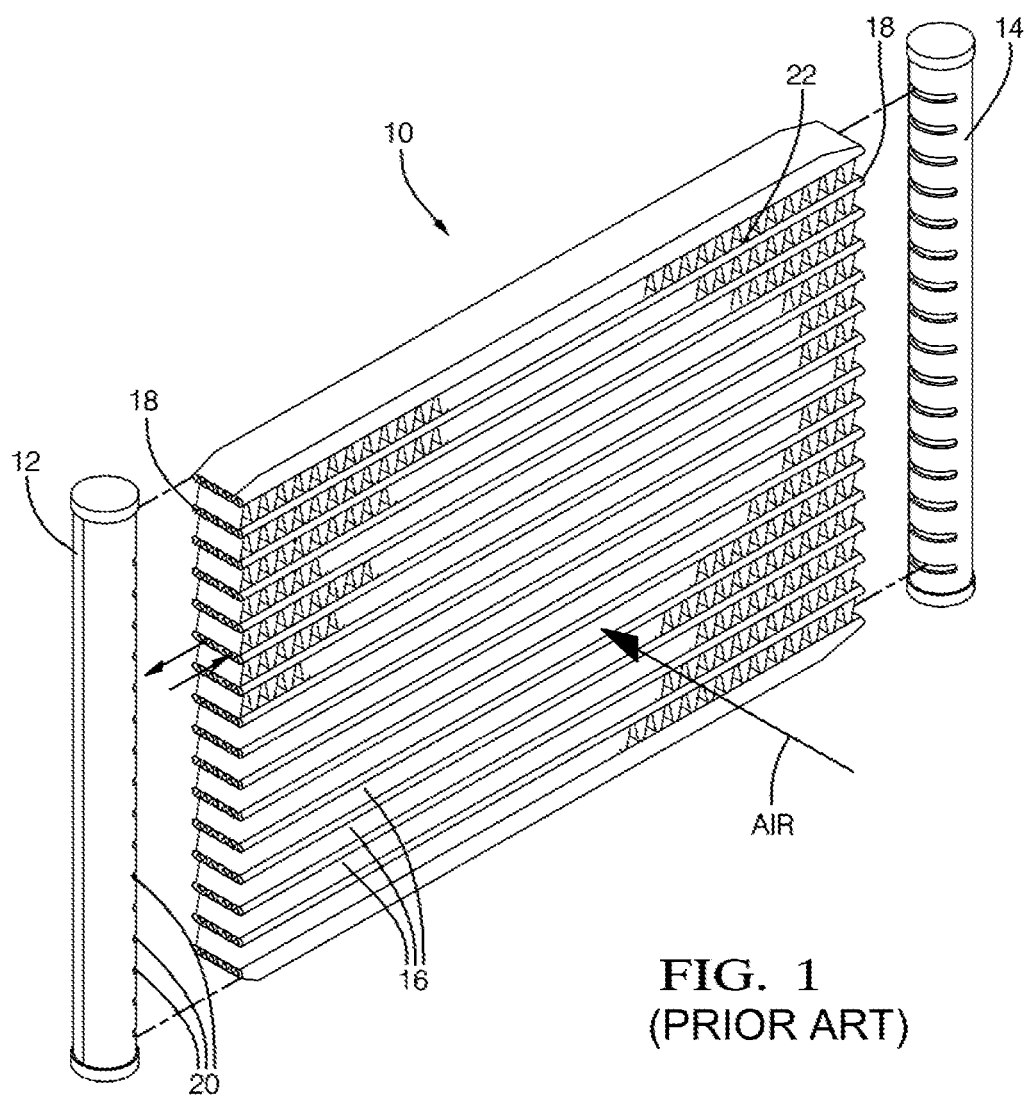
FIG. 1 is a typically heat exchanger assembly having refrigerant tube extending between two header manifolds and a corrugated fin center.
Figure 2:
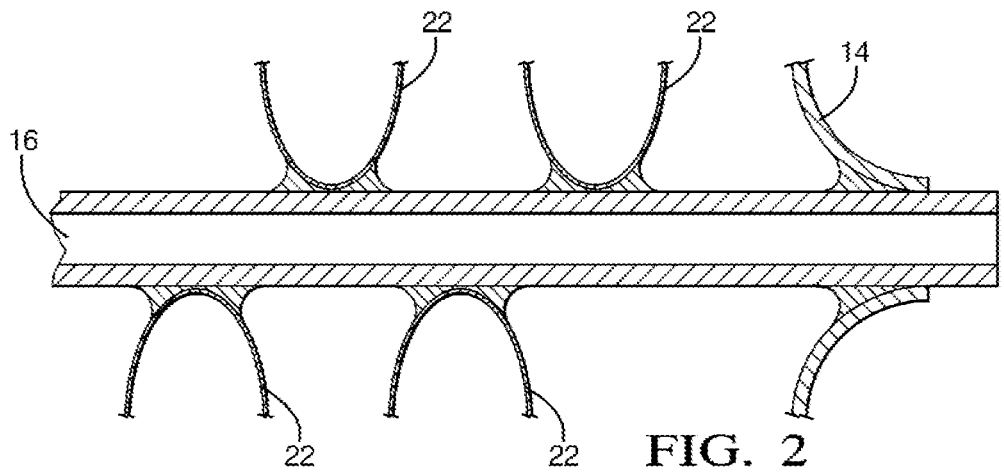

Shown in FIG. 2 is detail a cross-sectional view of a portion of the refrigerant tube, corrugated fin, and header of the heat exchanger of FIG. 1.

DETAILED DESCRIPTION OF INVENTION

Referring to FIG. 1, this is a perspective view of an exemplary heat exchanger assembly 10 having a plurality of refrigerant tubes 16 extending between a first header manifold 12 and a second header manifold 14. The heat exchanger assembly 10 may be that of a condenser or evaporator for a motor vehicle or a heat pump for residential/commercial building applications. Each of the refrigerant tubes 16 defines two opposing open ends 18 and a refrigerant passageway therebetween. The header manifolds 12, 14 include a plurality of corresponding header slots 20 that are configured to accept the open ends 18 of the corresponding tube ends. The refrigerant tubes 16 are in hydraulic connection with the first and second header manifolds 12, 14 for a two phase refrigerant flow therebetween.

An embodiment of the present invention provides a method of manufacturing a heat exchanger assembly 10 with an enhanced material system. The enhanced material system provides for an aluminum heat exchanger having superior corrosion resistance over that of aluminum heat exchangers known in the art. The enhanced material system includes refrigerant tubes 16 extruded from a high purity AA3000 series alloy billet having about 1.0 percent by weight (wt %) Mn and pre-braze treated with either a reactive zinc flux or a mixture of elemental zinc powder and a controlled atmosphere brazed (CAB) flux applied by glass plasma or organic binder, such as an acrylic binder, fins 22 formed from a modified AA3003 alloy having less than 0.05 wt % Cu and from 1.2 wt % to 1.8 wt % Zn, and header manifolds 12 and 14 manufactured from a AA3003 series alloy with a AA4000 series cladding having 0.9% to 1.1% Zn. The enhanced material system may also include a post braze coating comprising of a vanadium, zirconium or chromium conversion coating, titanium based ceramic coating, or an E-coat epoxy or polyurethane coating with primer pretreatment. The corrosion performance of the conversion coating may be additionally improved with a subsequent organic polymer resin topcoat.

The aluminum heat exchanger includes refrigerant tubes extruded from a high purity AA3000 series (AlMn1) alloy billet, which contains about 1% Mn with the balance of Al and trace element impurities. The use of high purity AlMn1 alloy ensures that Fe, Si, and Cu and Ni are maintained at or below trace impurity levels (see Table 1). During the casting process of a traditional AA3000-series alloy billet that is typically used to extrude refrigerant tubes, a range of coarse Fe intermetallic compounds, primarily $=Al_{12}(Fe, Mn)_3Si$ and AlFeSi, are formed. These iron intermetallic compounds are partially responsible for corrosion rate of traditional AA3000-series alloys since they provide small, localized anodic and cathodic precipitates compared to the surrounding aluminum-rich matrix, thereby creating a mixture of microgalvanic corrosion cells. Therefore, to increase corrosion resistance, a high purity AlMn1 alloy, having trace amounts of Fe and Si, along with low Cu and Ni, was utilized to reduce the volume fraction of iron-containing intermetallic phases and to reduce the activity of microgalvanic corrosion cells. The volume fractions of these coarse Fe intermetallics are lower; thereby making the AlMn1 alloy less susceptible to corrosion.

The surfaces of the AlMn1 alloy extruded refrigerant tubes are pre-applied with either a reactive zinc flux, $6KZnF_3$, or a mixture of elemental zinc powder and controlled atmosphere brazed (CAB) flux before brazing. The CAB flux may include potassium fluoroaluminate ($K_{1-3}AlF_{3-6}$) flux or a mixture of potassium fluoroaluminate flux ($K_{1-3}AlF_{3-6}$) and lithium flux ($Li_3AlF_6$). The reactive zinc flux is delivered by a roll coated organic binder, and the mixture of elemental zinc powder and CAB flux is delivered by gas plasma or a roll coated organic binder where the process of roll coating is by applying a coating to a flat substrate by passing it between two rollers. The organic binders, and any manufacturing oils used on the primary aluminum parts, are vaporized during a thermal degreasing heat treatment process before brazing.

During brazing, the reactive zinc flux ($6KZnF_3$) compound reacts with the extruded AlMn1 alloy tube to form elemental Zn and a potassium fluoroaluminate ($K_{1-3}AlF_{3-6}$) flux. The elemental Zn from the reactive zinc flux, or the elemental zinc powder, is diffused into the AlMn1 extruded tube alloy to form an anodic sacrificial corrosion protection layer. The flux dissolves surface oxides to allow the clad filler metal from the fins, which is discussed in greater detail below, to freely flow to create the braze fillets, thereby joining the fins with the tubes.

It was surprisingly found that by applying the reactive zinc flux by a roll coated organic binder, or by applying the mixture of elemental zinc powder and CAB flux by gas plasma or a roll coated organic binder, to the AlMn1 alloy extruded tubes, provides an aluminum heat exchanger with superior corrosion resistance as opposed to applying a pre-braze Zn coating with a traditional thermal arc spray process to the tubes. Applying the reactive zinc flux by a roll coated organic binder, or by applying the mixture of elemental zinc powder and CAB flux by gas plasma or a roll coated organic binder, to AlMn1 alloy delivers a higher uniform Zn pre-braze coverage with lower Zn weights, about 4 to 6 g/m$^2$. The uniform Zn coverage provides for a consistent post braze Zn diffusion layer. In contrast, traditional zinc thermal arc spray requires higher Zn weights, about 8 to 12 g/m$^2$, to assure uniform tube coverage and a consistent post braze Zn diffusion layer.

The Zn concentration in the diffusion layer formed in the post braze AlMn1 alloy tube from applying the reactive zinc flux by a roll coated organic binder, or by applying the mixture of elemental zinc powder and CAB flux by gas plasma or a roll coated organic binder, is less than 3 wt %, but above 1 wt %, to a maximum depth of approximately 85 microns beneath the surface. The Zn concentration in the diffusion layer from applying Zn by thermal arc spray zinc is approximately 4 to 7 wt % diffused to a depth of approximately 100 microns beneath the surface. Contrary to the teachings of the art, it was surprising found that a lower Zn concentration in the diffusion layer and the lesser depth of Zn diffusion provide a greater resistance to corrosion as compared to the higher Zn concentration and the greater depth of the Zn diffusion of the prior art. In other words, the refrigerant tubes, made by the method of the present invention, having a diffusion layer of Zn concentration of approximately 1 to 3 wt % with a maximum diffusion depth of 85 microns beneath the surface outperformed the prior art refrigerant tubes having a higher Zn concentration of approximately 4 to 7 wt % with a diffusion depth of approximately 100 microns.

If the pre-braze Zn weight applied by the traditional thermal arc spray process is reduced to a range of 4 to 8 g/m² in order to obtain a lower post-braze Zn diffusion concentration, it would result in non-uniformed areas of pre-braze coverage as low as 40%. This results in local areas of shallow diffusion depths or missing areas of Zn diffusion within in the AlMn1 alloy tube. This compromises the sacrificial corrosion protection mechanism. A minimum pre-braze uniform area of coverage of elemental Zn above 85% is needed to create a uniform and consistent post-braze Zn diffusion layer needed for corrosion performance. The method of applying the reactive zinc flux by a roll coated organic binder, or by applying the mixture of elemental zinc powder and CAB flux by gas plasma or a roll coated organic binder, of the present method provides a more uniform coverage of Zn on the surface of the AlMn1 alloy tube with a lower Zn weight in order to provide a lower concentration of Zn in the diffusion layer and a lower depth of diffusion of Zn beneath the surface after brazing.

The fins are formed of clad Al sheets comprising a low copper AA3003 series modified alloy for galvanic compatibility to the AlMn1 alloy extruded tube together with a Zn addition to further sacrificially protect the AlMn1 alloy extruded tube. The modified AA3003-type alloy includes less than 0.05% Cu by weight, about 1.5% Zn, and may include Zr (see Table 1).

The heat exchanger's header manifolds may be manufactured by welding an Al composite sheet having an AA3003 type series core alloy and an AA4000 series (AA4343 or AA4045) clad layer. The AA4000 series cladding alloy is formulated with Zn at approximately 0.9 to 1.1 wt % to achieve a post braze Zn diffusion layer within the AA3003 type core alloy. This creates manifolds with a Zn diffusion layer to balance out corrosion attack which increases service life.

After the assembly of the manifolds, tubes, and fins, a CAB flux is applied externally on the header manifold for the tube-to-header manifold joints before brazing. After brazing, the heat exchanger may be coated with a post braze coating consisting of a vanadium, zirconium or chromium conversion coating, titanium based ceramic coating or an E-coat epoxy or polyurethane coating with primer pretreatment. The corrosion performance of the conversion coating may be additionally improved with a subsequent organic polymer resin topcoat. These coating minimizes the formation of so-called 'white rust' corrosion products that appear on the surface of the tubes and fins.

TABLE 1

Elemental Composition of Enhanced Material System* (percent of total)

| | Si | Fe | Cu | Mn | Mg | Cr | Zn | Zr | Ti |
|---|---|---|---|---|---|---|---|---|---|
| Refrigerant tube (AlMn1) | 0.3 | 0.20 | 0.03 | 0.90-1.10 | — | — | — | — | |
| Fin Modified AA3003 | 0.3-1.0 | 0.4 | 0.05 | 1.3-1.8 | — | — | 1.2-1.8 | 0.20 | |
| Header-Manifold Core Modified AA3003 | 0.6 | 0.7 | 0.05-0.65 | 1.0-1.6 | 0.20 | — | 0.10 | — | 0.25% |
| Header-Manifold Cladding Modified AA4343 | 6.8-8.2 | 0.8 | 0.25 | 0.10 | — | — | 0.9-1.1 | — | |
| Alterantive Header-Manifold Cladding AA4045 | 9.0-11.0 | 0.8 | 0.30 | 0.05 | 0.05 | — | 0.9-1.1 | — | |

\* = Max percent by weight (wt %) unless range is noted.
— = 0.05 max percent by weight (wt %).

Mn levels were increased to approximately 1 wt % to make the AlMn1 alloy matrix for the refrigerant tubes more noble and to more closely match the electrochemical potentials of the other AA3003-type alloys used in the heat exchanger. Reduced potentials between component alloys decrease the driving force for corrosion. Higher Mn also increases the cold work response and burst strength of the alloy by solid solution strengthening. At higher Cu levels, Al—Cu corrosion products can create increased localized electrolyte corrosion attack by copper compounds being redeposited on the aluminum thereby creating highly active microgalvanic corrosion cells. For this reason, the Cu concentration was kept low in the tube and fin core alloys.

During brazing, the reactive zinc flux reacts with the tube aluminum forming elemental Zn and CAB flux. The elemental Zn then diffuses into the tube creating a Zn concentration gradient. This gradient is the sacrificial layer necessary for corrosion protection. The Zn diffuses approximately to a maximum of 85 microns deep during brazing. Another advantage to reactive zinc flux or elemental zinc powder and CAB flux as compared to zinc thermal arc spray is that the concentration beneath the surface is reduced to below 3%, but above 1%, Zn as compared to 4 to 7% for zinc thermal arc spray. This feature still makes the surface remain very anodic compared to the core for the purpose of sacrificial protection but the corrosion rates are lowered. This result is important for the top-coating. Topcoats over zinc thermal arc spray will tend to be undermined and form undesirable "zinc bloom." This occurs when corrosive electrolyte permeates through the coating and attacks the underlying zinc-rich layer forming a bloom of voluminous corrosion products that eventually delaminates the coating off the aluminum tube. With reactive zinc flux or elemental zinc powder and CAB flux, the near-surface layer is less zinc-laden and does not generally undermine the coating when attacked.

During careful homogenization of the new AlMn1 alloy casting billet prior to extrusion, smaller manganese-rich AlMnSi dispersoids are created. A proper homogenization schedule promotes the formation of a fine AlMnSi dispersoid network. This fine dispersoid network creates many nuclei locations for recrystallization during extrusion resulting in the formation of small grains. During brazing, excessive grain growth is prevented by the remaining undissolved dispersoids. The result is small grains post braze if the extruded tube has cold work from sizing below about 6% strain.

With the pre applied reactive zinc flux or elemental zinc powder and CAB flux on the refrigerant tube and with a pre-applied CAB flux on the header manifolds, the core assembly electrostatic or wet slurry fluxing is eliminated. With organic binders, the binders are vaporized in the front end of the braze furnace in the thermal degrease section by a controlled time and temperature.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the intentions without departing from the essential scope thereof. Therefore, it is intended that the invention not be limited to the particular embodiment disclosed as the best mode contemplated for carrying out this invention, but that the invention will include all embodiments falling within the scope of the appended claims.

Having described the invention, it is claimed:

1. A method of manufacturing an aluminum heat exchanger comprising the steps of:
    providing a plurality of refrigerant tubes extruded of an AA3000 series Al alloy having 0.3 percent by weight (wt %) max of Si, 0.20 wt % max of Fe, 0.03 wt % max of Cu, and between 0.90 to 1.10 wt % of Mn;
    applying a Zn coating onto the exterior surface of at least one of said plurality of refrigerant tubes;
    providing a plurality of fins manufactured from an AA3000 series Al alloy having 0.3 to 1.0 wt % of Si, 0.4 wt % of Fe max, 0.05 wt % max of Cu, from 1.3 to 1.8 wt % of Mn, between 1.2 to 1.8 wt % of Zn, and 0.20 wt % max of Zr;
    providing at least one header manifold having a plurality of refrigerant tube slots, wherein said at least one manifold is formed from an AA3000 series Al alloy sheet having a cladding, wherein said Al alloy sheet includes a core having 0.6 wt % max of Si, 0.7 wt % max of Fe, from 0.05 to 0.65 wt % of Cu, from 1.0 to 1.6 wt % of Mn, 0.20 wt % max of Mg, 0.10 wt % max of Zn, and 0.25 wt % max of Ti;
    assembling said fins between adjacent pairs of said refrigerant tubes;
    inserting the open ends of said plurality of refrigerant tubes into corresponding said refrigerant tube slots of header manifold, thereby forming a heat exchanger assembly; and
    heat treating said heat exchanger assembly at a sufficient time and temperature to braze said plurality of refrigerant tubes, fins, and said at least one header manifold into a single unitary structure, and to diffuse said Zn coating into said refrigerant tubes to form a Zn diffusion layer;
    wherein said step of said applying a Zn coating onto the exterior surface of at least one of said plurality of refrigerant tubes includes applying a sufficient amount of Zn to obtain said Zn diffusion layer having 1 to 3 wt % of Zn after brazing, and
    wherein said heat exchanger assembly is heat treated at a time and temperature to uniformly diffuse said Zn to less than 85 microns beneath said surface of refrigerant tube.

2. The method of manufacturing an aluminum heat exchanger of claim 1, wherein said cladding of Al alloy sheet of header manifold comprises 6.8 to 8.2 wt % of Si, 0.8 wt % max of Fe, 0.25 wt % max of Cu, 0.10 wt % max of Mn and 0.9 to 1.1 wt % Zn.

3. The method of manufacturing an aluminum heat exchanger of claim 1, wherein said cladding of Al alloy sheet of header manifold comprises 9.0 to 11.0 wt % of Si, 0.8 wt % max of Fe, 0.30 wt % max of Cu, 0.05 wt % max of Mn, 0.05 wt % max of Mg, and 0.9 to 1.1 wt % of Zn.

4. The method of manufacturing an aluminum heat exchanger of claim 1, wherein the step of applying a sufficient amount of Zn onto the exterior surface of at least one of said plurality of refrigerant tubes includes applying the exterior surface with a reactive Zn flux compound, wherein said reactive Zn flux compound is delivered by a roll coated organic binder.

5. The method of manufacturing an aluminum heat exchanger of claim 4, wherein said reactive Zn flux compound is $6KZnF_3$.

6. The method of manufacturing an aluminum heat exchanger of claim 1, wherein the step of applying a sufficient amount of Zn onto the exterior surface of at least one of said plurality of refrigerant tubes includes a mixture of elemental zinc powder and a controlled atmosphere brazed (CAB) flux applied by glass plasma or organic binder.

7. The method of manufacturing an aluminum heat exchanger of claim 6, wherein said CAB flux includes potassium fluoroaluminate (K 1-3 Al F3-6) flux or a mixture of potassium fluoroaluminate flux (K 1-3 Al F3-6) and lithium flux (Li3 AlF6).

8. The method of manufacturing an aluminum heat exchanger of claim 1, wherein said Zn is applied to greater than 85% of said surface area of refrigerant tube at about 4 to 6 g/m2 before brazing.

9. A method of manufacturing an aluminum heat exchanger comprising the steps of:
    providing a plurality of refrigerant tubes formed of a AA3000 series AlMn1 alloy;
    applying a zinc flux compound onto the surfaces of said AlMn1 alloy refrigerant tubes;
    providing a plurality of fins formed of AA3003 alloy having a 0.05 wt % max of Cu and 1.2 to 1.8 wt % of Zn;
    providing a header manifold having an AA4343 or AA4045 cladding formulated with a 0.9 to 1.1 wt % Zn addition;
    applying a controlled atmosphere brazed (CAB) flux on said header manifold;
    assembling said refrigerant tubes, said fins, and said header manifold, thereby forming a heat exchanger assembly; and
    thermal degreasing and brazing said heat exchanger assembly;

wherein said step of applying a zinc flux compound includes applying a sufficient amount of Zn to obtain said Zn diffusion layer having 1 to 3 wt % of Zn after brazing, and wherein said heat exchanger assembly is heat treated at a time and temperature to uniformly diffuse said Zn to less than 85 microns beneath said surface of refrigerant tube.

10. The method of manufacturing an aluminum heat exchanger of claim 9, wherein said zinc flux compound includes reactive zinc flux 6KZnF3 delivered by a roll coated organic binder.

11. The method of manufacturing an aluminum heat exchanger of claim 9, wherein said zinc flux compound includes a mixture of elemental zinc powder and CAB flux delivered by gas plasma or a roll coated organic binder.

12. The method of manufacturing an aluminum heat exchanger of claim 11, wherein said CAB flux includes a fluoroaluminate (K 1-3 Al F3-6) flux or a mixture of potassium fluoroaluminate flux (K 1-3 Al F3-6) and lithium flux (Li3 AlF6).

13. A method of manufacturing an aluminum heat exchanger comprising the steps of:

providing a plurality of refrigerant tubes extruded of an AA3000 series Al alloy having between 0.9 to 1.1 wt % of Mn;

applying a Zn coating onto the exterior surface of at least one of said plurality of refrigerant tubes;

providing a plurality of fins manufactured from an AA3000 series Al alloy having between 1.2 to 1.8 wt % of Zn and 0.05 wt % max of Cu;

providing at least one header manifold having a plurality of refrigerant tube slots, wherein said at least one manifold is formed from an AA3000 series Al alloy sheet having a cladding, wherein said Al alloy sheet includes a core having from 1.0 to 1.6 wt % of Mn;

assembling said fins between adjacent pairs of said refrigerant tubes;

inserting the open ends of said plurality of refrigerant tubes into corresponding said refrigerant tube slots of header manifold, thereby forming a heat exchanger assembly; and heat treating said heat exchanger assembly at a sufficient time and temperature to braze said plurality of refrigerant tubes, fins, and said at least one header manifold into a single unitary structure, and to diffuse said Zn coating into said refrigerant tubes to form a Zn diffusion layer;

wherein said step of said applying a Zn coating onto the exterior surface of at least one of said plurality of refrigerant tubes includes applying a sufficient amount of Zn to obtain said Zn diffusion layer having 1 to 3 wt % of Zn and a depth of less than 85 microns after brazing.

14. The method of manufacturing an aluminum heat exchanger of claim 13, further comprising the step of coating said heat exchanger assembly after brazing with a vanadium, zirconium or chromium conversion coating; a titanium based ceramic coating; or an E-coat epoxy or polyurethane coating with a primer pretreatment.

15. The method of manufacturing an aluminum heat exchanger of claim 14, further comprising the step applying an organic polymer resin topcoat.

* * * * *